Nov. 21, 1939.    N. A. CHRISTENSEN    2,180,795
PACKING
Filed Oct. 2, 1937    2 Sheets-Sheet 1
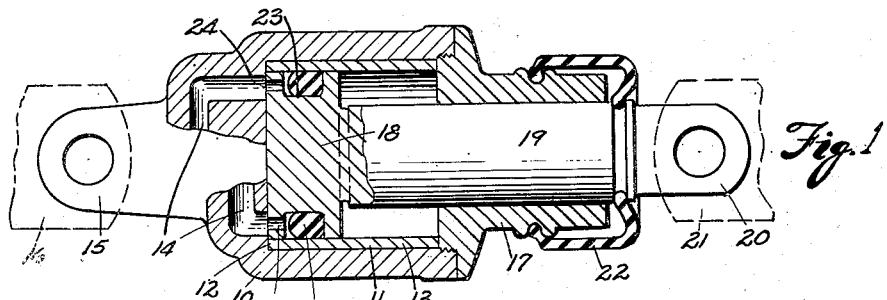
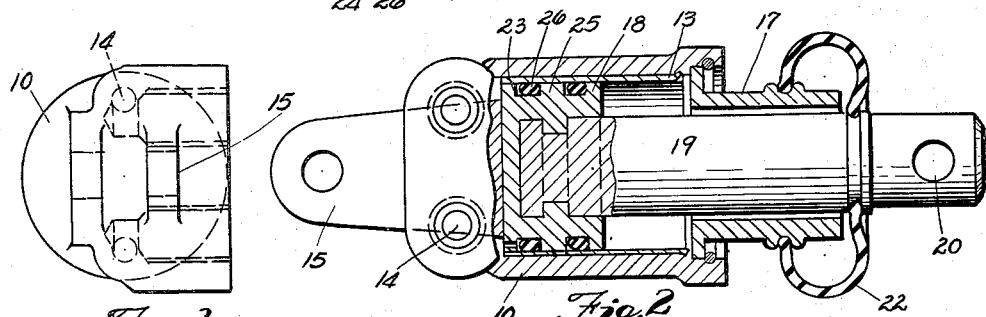
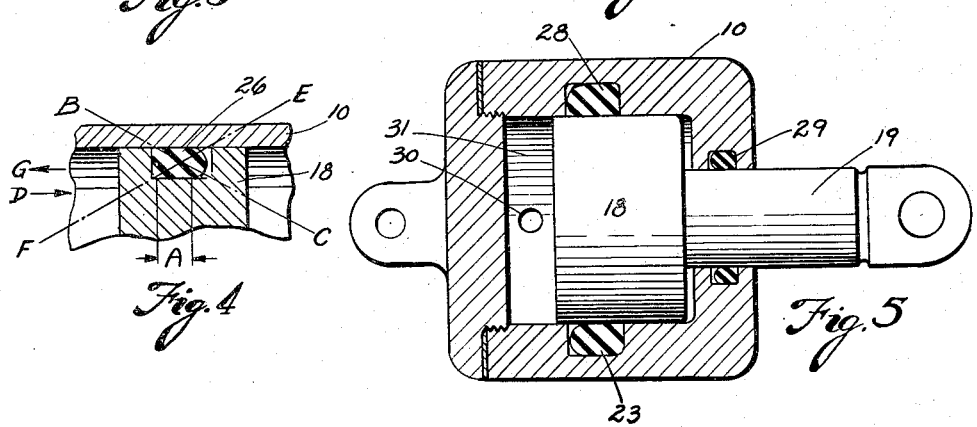
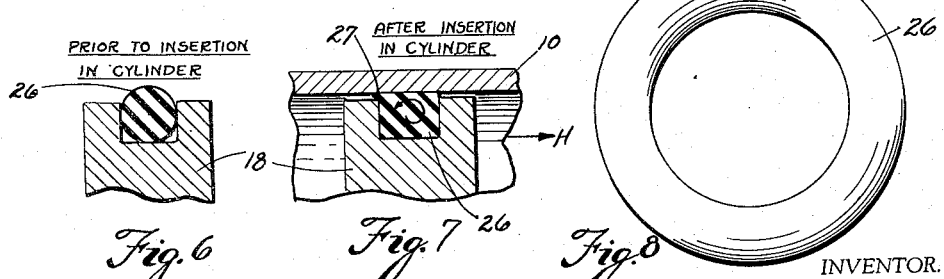
INVENTOR.
NIELS A. CHRISTENSEN
BY
ATTORNEY.

Patented Nov. 21, 1939

2,180,795

UNITED STATES PATENT OFFICE 2,180,795

PACKING

Niels A. Christensen, South Euclid, Ohio

Application October 2, 1937, Serial No. 166,996

5 Claims. (Cl. 309—23)

This invention relates to new and useful improvements in packings and the like for power cylinders, and is a continuation-in-part of my copending application Serial No. 704,463 for Hydraulic brakes, filed December 29, 1933 now U. S. Patent No. 2,115,383 granted April 26, 1938.

An important object of the invention is to provide a resilient packing ring associated with the packed members in a manner that it will be continually kneaded or worked to enhance its life.

Another object of the invention is to provide a packing of the above character which is suitable for use as a packing for fluid medium pistons whether the fluid be liquid or air.

Other objects and advantages of the invention will become apparent during the course of the following description.

In the accompanying drawings forming a part of the description and wherein like numerals are employed to designate like parts throughout the several views, Fig. 1 is a longitudinal section of a fluid power cylinder and piston in longitudinal section with the improved packing associated therewith.

Fig. 2 is a longitudinal section of a similar device in which more than one packing is employed for the piston.

Fig. 3 is an end elevation of the same.

Fig. 4 is an enlarged fragmentary vertical section through a piston and cylinder showing the packing ring associated therewith.

Fig. 5 is a longitudinal section of a piston and cylinder illustrating the packing located in a groove in the cylinder rather than in the piston.

Fig. 6 is an enlarged section showing the shape of the ring associated with the piston prior to its insertion into a cylinder.

Fig. 7 is a similar view showing the shape assumed by the ring after the ring and piston have been slipped into the cylinder and the ring compressed within its piston groove.

Fig. 8 is an elevation of the circular piston ring prior to association with either the piston or cylinder.

Figure 9:
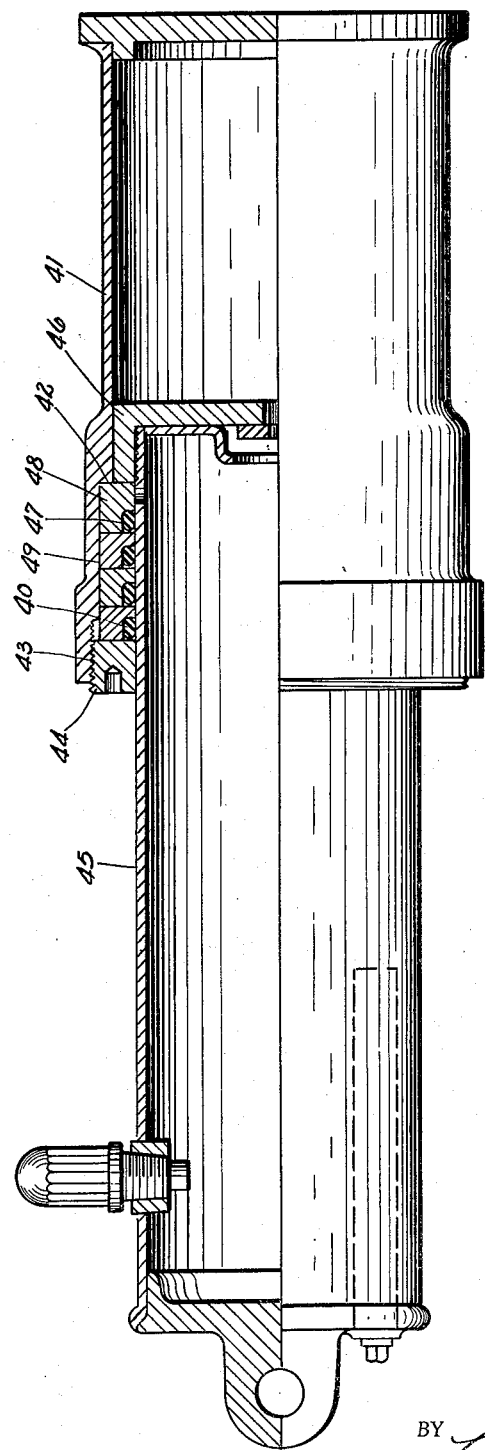
Fig. 9 is a longitudinal section through an air strut assembly.

Referring to the drawings in detail, the numeral 10 designates a cylinder or cylindrical casing, such as is used as the wheel cylinder of a brake system. This cylinder has a bore 11 terminating in a shoulder 12 adjacent its closed end and against which one end of a highly boned or polished steel liner 13 abuts.

This cylinder 10 may be economically formed from tubing, a casting or otherwise and is provided with fluid passages 14 through its closed end into the interior of the cylinder. This closed end is also provided with an integral lug formation 15 which may be pivotally connected to one end of the usual brake shoe 16 shown in dotted lines. The open end of the cylinder 10 is internally threaded, and a cap 17 having a bore therethrough is threaded into the open end of the cylinder to abut against the other end of the liner 13 and thereby retain it firmly in position within the cylinder to form a highly polished surface, upon which, operates a piston head 18 having a piston stem 19 projecting through the bore and the cap and outwardly therebeyond to terminate in an apertured formation 20 adapted to be pivotally connected to the other end of the brake shoe structure indicated at 21 in dotted lines. This type of brake operating cylinder may be suspended in this manner upon the separable ends of the brake shoe structure, or if desired, the cylinder may be provided with an integral casting or extension rigidly or floatingly associated with the usual backing plate of a brake. A rubber boot 22 having one end secured to the piston rod 19 and its other end to the cap 17, is provided, for excluding extraneous matter from the piston rod which operates in the elongated bore of the cap.

The piston head 18 is provided with a peripheral packing groove 23 having flat parallel side walls normal to the axis of the piston and a flat bottom or peripheral wall, as illustrated. The wall adjacent the forward working face of the piston is provided with a series of perforations or passages 24 so that the fluid medium operating on the forward working face of the piston may also pass through the passages 24 into the groove and operate against the packing placed in the groove.

In Fig. 2, is shown a piston head 25 having a pair of grooves placed longitudinally of the length of the head, the groove located nearest the rear end of the piston not being communicated with the other groove or the space in front of the working face of the piston. The provision of this second groove for the reception of a second packing serves as a further seal and safety factor so that if the packing adjacent the forward working face of the piston is defective for any reason, the second packing will be sufficient to seal the piston against the passage of fluid past the piston.

My improved packing rings to seat in such grooves, are designated by the numerals 26 and are made of solid rubber or rubber composition very dense and yet possessive of great liveliness and compressibility. A glyptol composition has been found extremely serviceable and resistant to wear and leakage throughout prolonged and severe tests. Each packing ring is perfectly circular in cross section prior to its assembly and insertion in a cylinder, and possesses a normal circular cross section as shown in Fig. 6. Its inner periphery is slightly less in circumference than the circumference of the bottom of the groove in the piston, while its exterior peripheral circumference is greater than the circumference of the inner cylinder wall or liner, so that when the packing is slid with the piston into the cylinder, the ring is compressed to the shapes somewhat shown in Figs. 1 and 4 to have somewhat of an ellipsoidal or rather square or rectangular cross section, conforming rather closely to the cross sectional shape of the groove in the piston. When compressed within its groove, the packing ring flattens out as shown in Figs. 4 and 7 so that the portion of the ring contacting with the bottom of the groove is flat, as well as its outer periphery which contacts with the cylinder substantially over the area designated by the dimensional lines A and at least one side of the ring flattens out against at least one flat side of the groove, or both sides in the event the groove is made substantially the same width as the width of the ring in compression. If this groove is made fractionally wider preferably by a fraction of the diameter of the ring section than the width of the ring section when compressed, then one side of the ring is not as flat as its other side which contacts with the side of the groove. In any event, it is advantageous that the packing ring be not compressed solid within the groove but that the dimensions of the latter be such that when the ring is assembled with the piston and cylinder, it has slight freedom of movement to be worked or kneaded during the piston reciprocation in order to maintain the rubber in a live state and to prolong its serviceable life. I have found in one embodiment of the invention, that a circular section ring having a section diameter of three-sixteenths of an inch serves admirably for the purposes of a packing of small hydraulic cylinders, when the ring is compressed about one-sixteenth of an inch when installed thereby causing the normal circular section of the ring to flatten out to the extent of about three-thirty-seconds of an inch on its opposite sides. In other words, the minor diameter of the section when installed is approximately five-thirty-seconds of an inch while its major diameter is approximately seven-thirty-seconds of an inch. When in this compressed state when in its groove, the groove is approximately one-sixteenth of an inch wider than the major diameter of the ellipsoidal form of the ring, so that the ring when compressed in the groove will have freedom of movement to be worked or kneaded to prolong its life. This particular fit of the ring in its operative position enables the packing ring to shift slightly within the groove, but not sufficient to permit complete turning of the ring out upon its axis as would be caused by a wider groove permitting the ring to twist through 360 degrees. This shifting or partial twisting or oscillating tendency of the ring, as by the shifting of point B to E and C to F when the piston moves in the direction of the arrow G in Fig. 4, works or kneads the material of the ring to keep it alive and pliable without the deleterious effects of scuffing which are caused by purely static sliding of rubber upon a surface. By this slight kneading action, the life of the ring is prolonged. When the piston moves in the direction of arrow D, the point E shifts in the direction of point B and point F has a tendency toward shifting toward C, causing the ring to move against the left hand wall of the groove and thereafter slide along the wall of the cylinder. When the piston moves in the direction of the arrow G of Fig. 4, the packing ring moves against the right hand wall of the groove and due to the possible adhesive tendencies of the ring on the wall, point B tends to move toward point E while the point C tends to move toward point F or in other words, the packing ring tends to turn clockwise about the center of its cross section.

In cases where the packing ring almost fills the groove as shown in Fig. 7, and when the piston is moved in the direction of the arrow H, adhesive tendencies of the ring to the cylinder wall tends to twist the ring counter-clockwise and create an annular fin or projection 27 on the trailing side of the ring between the piston and cylinder wall. When the piston moves in the opposite direction, the packing ring tends to rotate clockwise and to produce the fin 27 at the opposite side of the ring.

In Fig. 5, the same kind of packing ring 28 is positioned in a groove in the cylinder wall instead of the piston head and a similar ring 29 forms a packing for the stem 19 of the piston. Fluid under pressure enters the piston through passage 30 in the chamber 31 against the working face of piston 18. If desired, two of such pistons in any of the forms illustrated may be provided to work in opposite directions with a fluid pressure chamber interposed between the two pistons.

Fig. 9 shows the use of the rings 40 for stuffing box service, obviating adjustment of the box for its entire life. In the present instance this stuffing box is illustrated in connection with an air strut assembly for use on aeroplanes. These packing rings may be any of the forms hereinbefore described and are preferably carried in multiple by the cylinder 41 having an internal annular shoulder 42 and an internally threaded open end 43 to receive an annular bearing nut 44. A piston 45 is slidably engaged with the opening in the nut 44 and its inner end is provided with a piston head 46 screwed on to the end of the piston to slidably engage the bore of cylinder 41.

A plurality of packing rings 40 are employed in this type of stuffing box and each is disposed in an annular groove 47 in the outermost face of a follower ring 48 having an outer circumference equal to the inner circumference of the enlarged bore 49 of the cylinder and an inner peripheral circumference equal to the piston 45. A gasket is positioned between the shoulder 42 and the adjacent follower ring 48 and the abutting faces of the follower rings 48 are shellacked. These rings 48 with their respective packing rings 40 are juxtaposed in series as illustrated and are retained in position by the retainer nut 44. This nut is screwed down solidly and never disturbed, except for replacing the rings, thus eliminating the human element necessary for the delicate adjustment of ordinary stuffing boxes, which become either too loose, causing leakage, or too tight causing undue friction. The packing ring grooves 47 are thus defined between a pair of complementary follower rings 48, so that irrespective of the pressure applied to these rings by the retainer nut 44, the packing rings 40 are unaffected.

It will be understood that various changes in the size, shape and relation of parts may be resorted to without departing from the spirit or scope of the appended claims.

I claim:

1. In a fluid pressure mechanism, a pair of relatively movable elements, one of said elements having a packing groove with a substantially flat bottom wall parallel to the axis of motion of said elements, a resilient elastic composition packing ring of normally round cross-section positioned in said groove, said groove having bottom and side walls and being of such dimensions that the ring when operatively positioned therein between said elements is compressed a fractional part of its radial dimension and is expanded in its axial dimension to form a seal between said elements, the axial dimension of said groove exceeding the axial dimension of the ring when in operative position by a fraction only of the axial dimension of the ring to allow for expansion and kneading action of the ring during movement of the elements and to prevent rolling of the ring through more than 180°.

2. In a fluid pressure actuating mechanism, a cylinder, a piston having an outwardly facing packing ring groove defined by side and bottom walls, and a resilient elastic solid section packing ring compressed between the walls of the cylinder and the bottom wall of the groove to slide on the cylinder wall, the groove having a fixed slightly larger cross-sectional area than the cross sectional area of the compressed packing ring and having a surface contact with the ring at the bottom of the groove for a distance parallel with the axis of the piston and said ring having its surface portion flattened against the cylinder wall whereby relative movement of the cylinder and piston effects a slight oscillation of the ring to effect kneading action thereof upon each stroke of the piston prior to sliding of the ring.

3. The combination with a cylinder and piston, one of which is provided with a groove, of a resilient elastic packing ring of a composition such that kneading action prolongs the life thereof and is capable of sliding movement against the piston or cylinder wall, said packing ring being continuous and integral and having a normally symmetrical cross-section, and the groove being of such depth that when the ring is in position between said cylinder and piston it is compressed a fractional part of its normal radial dimension, and the groove having a width slightly greater than the axial dimension of the compressed ring, whereby the beginning of relative movement on each working stroke of the piston effects first a slight twisting or rolling motion and then a sliding action between the ring and the piston or cylinder wall to prolong the life of the ring.

4. The combination with relatively slidable cylinder and piston elements, one of which is provided with a groove, of an elastic packing ring therebetween, comprised of a composition such that kneading action prolongs the life thereof and is capable of sliding movement, said packing ring being continuous and integral and being so dimensioned that when the ring is in position it is compressed in its radial dimension, and the groove having a width slightly greater than the axial dimension of the compressed ring whereby the beginning of relative movement on each working stroke of the elements effects first the kneading action and then a sliding action on the ring.

5. The combination of a cylinder and piston, of a resilient elastic packing element therebetween having normally approximately circular cross-section, of a groove having a flat bottom portion spaced from the cylinder wall a distance less than the normal radial dimension of the ring, whereby when the ring is in the groove in operative position, it is compressed into somewhat ellipsoidal cross-section, and the width of the groove being greater than the axial dimension of said compressed ring by a fractional part of said axial dimension.

NIELS A. CHRISTENSEN.